US011907208B1

(12) United States Patent
Tayeb et al.

(10) Patent No.: US 11,907,208 B1
(45) Date of Patent: Feb. 20, 2024

(54) DETECTING AND CORRECTING OUTLIERS IN CATEGORIES OF TRANSACTIONS

(71) Applicant: INTUIT INC., Mountain View, CA (US)

(72) Inventors: Yaakov Tayeb, Tzur Hadassa (IL); Yael Hochma, Tel Aviv (IL); Rineke Van Noort, London (GB); Noah Eyal Altman, Hod HaSharon (IL)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/162,251

(22) Filed: Jan. 31, 2023

(51) Int. Cl.
*G06F 16/23* (2019.01)
*G06F 16/28* (2019.01)

(52) U.S. Cl.
CPC ........ *G06F 16/2379* (2019.01); *G06F 16/285* (2019.01)

(58) Field of Classification Search
CPC .............. G06F 16/2379; G06F 16/285; G06F 18/2433; G06K 9/6284
See application file for complete search history.

(56) References Cited

U.S. PATENT DOCUMENTS

| | | | | |
|---|---|---|---|---|
| 2006/0053123 A1* | 3/2006 | Ide | ........................... | G06F 16/35 |
| 2010/0161609 A1* | 6/2010 | Fogel | .................. | G06F 18/2433 |
| | | | | 707/E17.089 |
| 2018/0316707 A1* | 11/2018 | Dodson | ................... | H04L 43/16 |
| 2019/0205993 A1* | 7/2019 | Rodriguez | ............ | H04L 67/535 |
| 2020/0242417 A1* | 7/2020 | Sagi | ..................... | G06F 18/2433 |
| 2021/0142292 A1* | 5/2021 | Ozcaglar | ................. | G06F 18/24 |
| 2021/0383407 A1* | 12/2021 | Pati | ........................ | G06N 20/00 |
| 2022/0366316 A1* | 11/2022 | Sharma | .................. | G06V 10/75 |

\* cited by examiner

*Primary Examiner* — Robert W Beausoliel, Jr.
*Assistant Examiner* — Mohammad S Bhuyan
(74) *Attorney, Agent, or Firm* — Patterson + Sheridan, LLP (57) ABSTRACT

The present disclosure provides techniques for detecting and correcting outliers in categories of transactions. One example method includes receiving electronic transaction data indicative of one or more current transactions, wherein the one or more current transactions are associated with a user of a software application, identifying, for each transaction of the one or more transactions, a category using a first machine learning model, computing a distribution for each category of a plurality of categories of the user, identifying, a particular category of the user as an anomalous category, based on the distribution for the particular category of the user and corresponding distributions for the particular category of other users, and updating a category assigned to one or more transactions such that a delta between a value relating to the anomalous category of the user and corresponding values relating to the particular category of the other users is reduced.

20 Claims, 4 Drawing Sheets

DETECTING AND CORRECTING OUTLIERS IN CATEGORIES OF TRANSACTIONS

INTRODUCTION

Aspects of the present disclosure relate to detecting and correcting outliers in categories of transactions.

In many software applications, data, such as transaction records, may be classified in order to perform various tasks with respect to specific types of transactions. For example, in a software application used for accounting and tracking of expenses and income, transaction records associated with each of a plurality of transactions may be classified to allow for aggregation and analysis of specific types of transactions (e.g., for categorical expense tracking, tax preparation purposes, and so on). In some cases, these transactions may be categorized manually. However, manual categorization of transaction records may be inaccurate, which may cause downstream processes based on such classification to also be inaccurate. In other cases, machine learning models, such as classification models, can be used to classify transactions. However, these machine learning models may also not accurately classify transactions, which may similarly cause downstream processes based on such classification to also be inaccurate.

To correct for inaccuracies in the classifications of transactions performed manually or generated by machine learning models, various anomaly detection techniques can be used to determine whether a classification assigned to a transaction is likely to be accurate or inaccurate. Anomaly detection for the classification of transactions in software applications is typically performed on-demand and may not be performed as part of a continuous process. Further, anomaly detection may be performed on each transaction in isolation based on various properties of a specific transaction. This may cause some transactions to remain inaccurately classified.

Accordingly, improved systems and methods are needed for detecting and correcting outliers in categories of transactions.

BRIEF SUMMARY

Certain embodiments provide a method for detecting and correcting outliers in categories of transactions. The method generally includes receiving electronic transaction data indicative of one or more current transactions, wherein the one or more current transactions are associated with a user of a software application, identifying, for each transaction of the one or more transactions, a category using a first machine learning model, computing a distribution for each category of a plurality of categories of the user, identifying, a particular category of the user as an anomalous category, based on the distribution for the particular category of the user and corresponding distributions for the particular category of other users, and updating a category assigned to one or more transactions such that a delta between a value relating to the anomalous category of the user and corresponding values relating to the particular category of the other users is reduced.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of the various embodiments.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for detecting and correcting outliers in categories of transactions.

Transaction records can be manually classified (or categorized) or classified using machine learning models for use in various downstream actions within a software application. However, these classifications assigned to transactions may be inaccurate and lead to inaccuracies in these downstream actions within the software application or in other software applications, which in turn may lead to other problems with the output generated by the software application or these other software applications. For example, in an accounting application, inaccurate classification of transactions may lead to the generation of inaccurate reports or other outputs based on the transactions included in each category (e.g., tax returns that incorrect claim deductions for ineligible transactions). The reports or other outputs generated based on such inaccurate transaction classifications may in turn lead to other problems for the user of the software application, such as audits or other disruptions.

Generally, machine learning models can be used to classify transactions and determine, or at least predict, whether a transaction has been incorrectly classified. However, these machine learning models may be used on a "one-shot" basis in which a determination of whether a transaction classification is incorrect (or at least is likely to be incorrect) is performed once in respect of a particular transaction. In other words, if the classification assigned to a transaction is changed from one incorrect classification to another incorrect classification (either by a user manually or by a machine learning model), machine learning models used on a one-shot basis will not point out to the user that the new classification for the transaction is also incorrect. Thus, software applications that provide services related to electronic transactions are limited by this inability to guarantee that the classifications assigned to electronic transaction records are correct after changes.

Embodiments of the present disclosure address these deficiencies in electronic transactions and resulting limitations in software applications by utilizing historical transactions to determine a correct category for transactions.

Machine learning techniques can be utilized to first classify (e.g., predict a category for) newly recorded transactions, also known as current transactions (e.g., whose category is undetermined). In some aspects, a first machine learning model is used to predict the category of the current transactions based on historical transactions (e.g., with known categories) sharing the same recipient (e.g., counterparty) as the transaction. For example, if a current transaction is between a user and a particular recipient, the known categories of historical transactions associated with the particular recipient can be used to compute a set of probabilities for the categories, and the category of the current transaction can be predicted based on the set of probabilities (e.g., the category with the highest probability in the set of probabilities).

Once the category of a current transaction is predicted, the current transaction can be aggregated with historical transactions sharing the same user. A distribution (e.g., via parameters such as statistical descriptors) can be calculated for each category using the aggregated transactions. In some aspects, the distribution parameters are normalized. The distribution parameters of the categories can be used to identify a particular category as an anomaly (e.g., relative to the particular category of other users). In some aspect, a second machine learning model is used to identify the anomalous category.

If a particular category is identified as an anomaly, some transactions in the aggregated transactions may be assigned incorrect categories, and correct categories may need to be reassigned to these transactions. In some aspects, a direction of the anomaly is calculated. For example, parameters (e.g., the statistical descriptors) of the anomalous category can be used to calculate a direction to its nearest non-anomalous neighbor category (e.g., the particular category of another user that is non-anomalous with the least distance to the anomalous category). The direction of the anomaly can indicate whether the parameters of the anomalous category are higher or lower than the parameters of its nearest non-anomalous neighbor category. Details regarding calculating distances between particular categories across users can be found below with respect to FIG. 1.

A set of candidate transactions whose categories need to be reassigned can be identified based on the direction of the anomaly. Candidate transactions can be the transactions in the aggregated transactions of a user whose categories are predicted with low confidence (e.g., below a threshold probability, or where the probability associated with the predicted category is close to a probability associated with another category). The categories of the candidate transactions can be updated to reduce the direction of the anomaly.

In some examples, if the direction of the anomaly is too high (e.g., the aggregated transaction amount for the category of a user is excessively high relative to the aggregated transaction amounts for the category of another user), too many transactions are assigned to this category. Candidate transactions can be identified in this category of the user, where the category of some candidate transactions can be updated to another category based on the set of probabilities (e.g., the category with the next highest probability in the set of probabilities), as discussed above. This operation can reduce the direction of the anomaly (e.g., the delta between aggregated transaction amounts of the category of the user and the aggregated transaction amounts for the category of another user) by excluding some transactions from the anomalous category of the user.

In some examples, alternatively, if the direction of the anomaly is too low (e.g., the aggregated transaction amount for the category of a user is excessively low relative to the aggregated transaction amounts for the category of another user), too few transactions are assigned to this category. Candidate transactions can be identified in other categories of the user, where the category of some candidate transactions can be updated to the anomalous category based on the set of probabilities (e.g., if a probability associated with the anomalous category is the next highest probability in the set of probabilities for some candidate transactions), as discussed above. This operation can reduce the direction of the anomaly (e.g., the delta between aggregated transaction amounts of the category of the user and the aggregated transaction amounts for the category of another user) by including more transactions into the anomalous category of the user.

Once the categories of the candidate transactions are updated, the distribution parameters of the categories can be recalculated, which can be used to identify new anomalous categories and then to reassign the categories of new candidate transactions, if any. This iterative process terminates when none of the categories is an anomaly (e.g., all current transactions are assigned to the correct category, or at least are assumed to be assigned to the correct category based on statistical similarities between the categories of the user).

By utilizing known categories of the historical transactions, techniques described herein overcome deficiencies in existing techniques for computer-based analysis of electronic transactions with limited information the categories of the transactions. In addition, the machine learning based category prediction and anomaly detection allows accurate detections of anomalies. The iterative process of identifying anomalous categories and reshuffling candidate transactions into different categories ensures each current transaction is assigned a correct category. Furthermore, by detecting anomalies in categories of aggregated transactions instead of individual transactions, techniques described herein allows correcting the categories of the current transactions in parallel, saving precious financial and computational resources. Still further, updated categorizations (or classifications) assigned to transactions may be used to retrain machine learning models used in categorizing transactions, which may improve the accuracy of such machine learning models and, over time, reduce the computational expense (e.g., processor time or cycles, memory, network bandwidth utilization, etc.) involved in identifying transactions in anomalous categories and reclassifying such transactions.

Thus, embodiments of the present disclosure provide a technical improvement with respect to conventional techniques for detecting and correcting outliers in categories of transactions, and improve the user experience of computing applications by automatically predicting and correcting categories of transactions with minimum error and human intervention.

Figure 1:
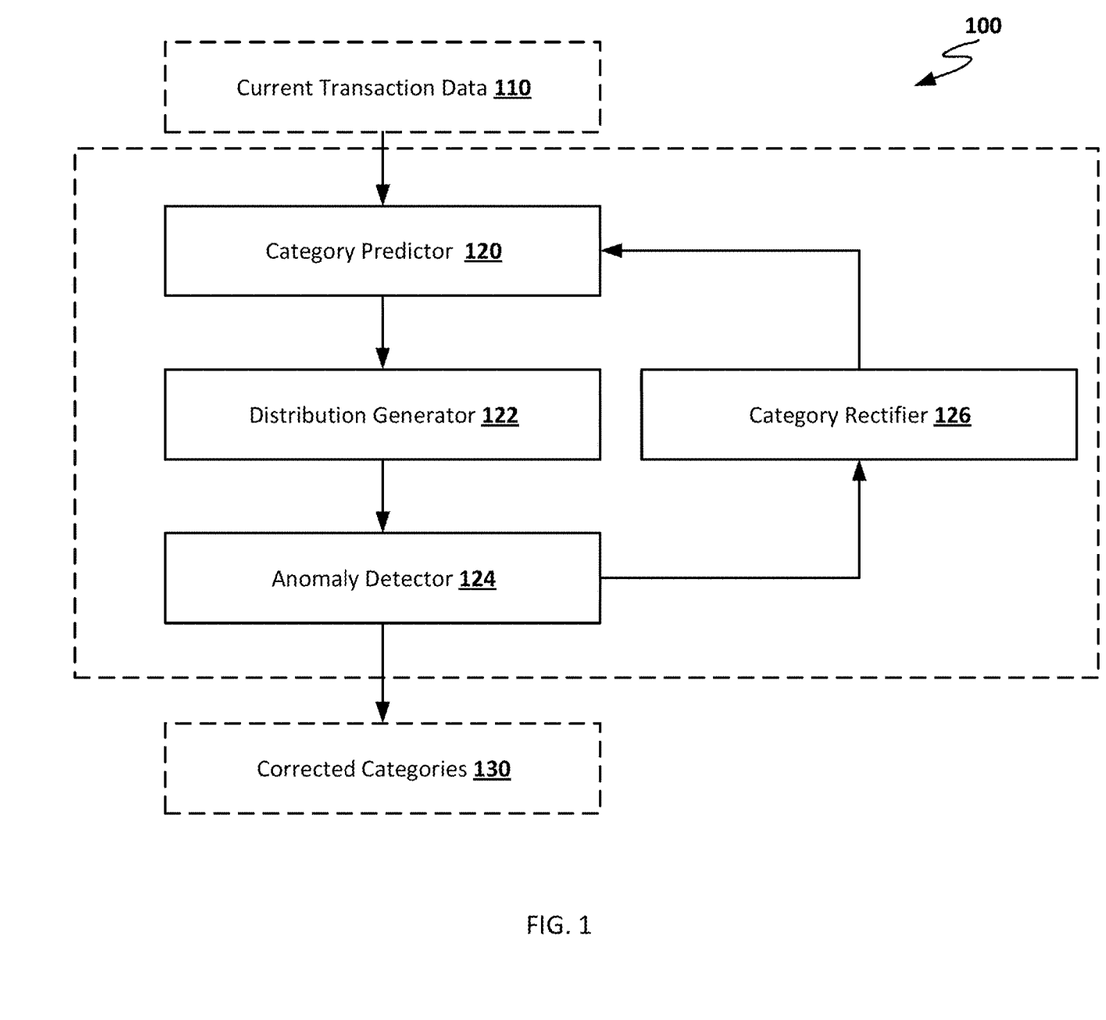
FIG. 1 depicts an example categorization system for detecting and correcting outliers in categories of transactions.

Example Categorization System for Detecting and Correcting Outliers in Categories of Transactions FIG. 1 depicts an example categorization system 100 for detecting and correcting outliers in categories of transactions. Categorization system 100 can receive current transaction data 110 as inputs and generate corrected categories 130 as the output. Current transaction data 110 can be electronic data.

Current transaction data 110 can indicate one or more current transactions, such as in the form of electronic transaction records. Each of the one or more current transactions can be associated with a user (e.g., payer) and a recipient (e.g., a payee), and has a category (e.g., categorical attributes such as expense types) to be determined. For simplicity, in the following discussion, the one or more current transactions are assumed to share one unique user.

Current transaction data 110 can be provided as inputs to category predictor 120. Category predictor 120 can retrieve (e.g., from a database) historical transactions associated with each unique recipient indicated in the current transactions, where each historical transaction has a known category. Category predictor 120 can calculated a set of probabilities for each current transaction. The set of probabilities can be represented using appropriate data structures, such as a vector, a dictionary, a list, and so on.

In some examples, the set of probabilities are calculated using the counts (or frequencies) of categories in the historical transactions, such that the set of probabilities are the normalized counts (or frequencies) of the categories (e.g., with respect to the sum of the counts). For example, the categories represent expense types, and a current transaction shares the same recipient with historical transactions which indicate 60 counts of "travel" expenses and 40 counts of "transportation" expenses. Following the example, the set of probabilities can include a probability of 0.6 for "travel" and a probability of 0.4 for "transportation".

In some examples, alternatively, the set of probabilities are calculated using the counts (or frequencies) of unique users designating a category in the historical transactions, such that the set of probabilities include the normalized counts (or frequencies) of the number of unique users per each category (e.g., with respect to the sum of the counts). For example, the categories represent expense types, and a current transaction shares the same recipient with historical transactions, where 10 of the unique users designating the category of their historical transactions as "travel" expenses and the remaining 30 of the unique users designating the category of their historical transactions as "transportation" expenses. Following the example, the set of probabilities can include a probability of 0.25 for "travel" and a probability of 0.75 for "transportation".

In some examples, categories with counts (e.g., counts of transactions or counts of the users, as discussed above) below a threshold (e.g., 1000 counts) are excluded from computing the set of probabilities. The threshold of counts can ensure that the probabilities are not skewed by several categories with large numbers of counts.

Category predictor 120 can further predict a category for each current transaction based on the counts or the set of probabilities. For example, for a current transaction, the category with the highest probability in the set of probabilities can be predicted as the category of the current transaction. Following the example, category predictor 120 can include a machine learning model, such as a Naive Bayes classifier. In some examples, additionally or alternatively, additional information can be used to predict the category for each current transaction, such as information extracted from the transaction memo (e.g., using natural language processing techniques), additional information (e.g., a transaction amount, a transaction time, a user identifier, and/or the like) in a current transaction, and so on. Accordingly, category predictor 120 can include one or more other machine learning classifiers, such as a support vector machine (SVM), a logistic regression model, a neural network, a gradient-boosted tree classifier and/or the like. In some examples, the set of probabilities for each transaction is combined (e.g., concatenated) with the transaction and stored (e.g., in a database).

The current transactions with predicted categories can be provided as inputs to distribution generator 122 to compute distribution parameters for each category. Distribution generator 122 can first aggregate (e.g., concatenate) current transactions with historical transactions sharing the same user. For each category, distribution generator 122 can compute parameters (e.g., statistical descriptors such as mean, standard deviation, sum, and so on) based on the information (e.g., a transaction amount) in the aggregated transactions. The parameters of each user can be represented using appropriate data structures, such as a matrix, a tensor, a Pandas DataFrame, and so on.

The parameters can be normalized for each user. In some examples, each parameter is normalized with respect to the sum of the parameter across the categories. For example, the categories are "travel" and "transportation", and a parameter is the mean. Following the example, the mean of "travel" and the mean of "transportation" can be normalized with respect to the sum of the means of "travel" and "transportation", respectively. In some examples, alternatively, each parameter is normalized to a z-score in the parameter across the categories. Following the example above, the mean of "travel" and the mean of "transportation" can be normalized to z-scores based on a distribution of the means. Details regarding normalizing parameters can be found below with respect to FIG. 2.

The combined (e.g., aggregated) parameters of different users can be provided as inputs to anomaly detector 124 to identify particular categories of a user as anomalous categories, relative to the particular categories of other users. An anomalous category can have a direction of anomaly, such as the parameters of the anomalous category is too high or too low. The direction of anomaly of the anomalous category can be calculated with respect to its nearest non-anomalous neighbor category (e.g., the particular category of another user that is non-anomalous with the least distance to the anomalous category).

In some examples, the nearest anomalous neighbor category is identified based on the distances between the distributions of the anomalous category of a user and the category of other users. In such examples, the distance between the distributions of two different categories are calculated based on a metric, such as Mahalanobis distance, L-2 distance, cosine distance, and/or the like.

In such examples, additionally, anomaly detector 124 can include a machine learning classifier, such as a Naive Bayesian classifier, a variational autoencoder (VAE), a Bayesian neural network, and/or other machine learning classifiers capable of considering the covariance between the categories, as the categories are usually correlated.

In some examples, a particular category is identified as an anomaly based on the score of the machine learning classifier. A category whose score meets a threshold score can be identified as an anomaly. The threshold score can be set statically (e.g., as a fixed numerical value, such as 0.8) or dynamically (e.g., as a variable numerical value, such as the $80^{th}$ percentile of all output scores of the machine learning classifier). Details regarding direction of an anomaly can be found below with respect to FIG. 2.

Each anomalous category and the associated direction of the anomaly can be provided as inputs to category rectifier 126 to reassign the categories of some of the aggregated transactions. Category rectifier 126 can first identify a subset of the aggregated transactions of a user as candidate transactions based on the direction of the anomaly. For example, candidate transactions can be the transactions whose categories are predicted below a threshold probability. The threshold probability can be set statically (e.g., as a fixed numerical value, such as 0.4) or dynamically (e.g., as a variable numerical value, such as the $25^{th}$ percentile of all probabilities predicted for a given category). The categories of some candidate transactions can be reassigned to other categories to reduce the direction of the anomaly.

In some examples, if the direction of the anomaly is too high (e.g., the aggregated transaction amount for the particular category of the user is excessively high relative to the aggregated transaction amounts for the particular category of other users), too many transactions are assigned to this category. Candidate transactions can be identified in this category of the user, where the category of some candidate transactions can be reassigned by category rectifier 126 to another category based on the set of probabilities (e.g., the category with the next highest probability in the set of probabilities), as discussed above. This operation can reduce the direction of the anomaly (e.g., the delta between aggregated transaction amounts of the category of the user and the aggregated transaction amounts for the category of another user) by excluding some transactions from the anomalous category.

In some examples, alternatively, if the direction of the anomaly is too low (e.g., the aggregated transaction amount for the particular category of the user is excessively low relative to the aggregated transaction amounts for the particular category of other users), too few transactions are assigned to this category. Candidate transactions can be identified in other category of the user, where the category of some candidate transactions can be reassigned by category rectifier 126 to the anomalous category based on the set of probabilities (e.g., if a probability associated with the anomalous category is the next highest probability in the set of probabilities for some candidate transactions), as discussed above. This operation can reduce the direction of the anomaly (e.g., the delta between aggregated transaction amounts of the category of the user and the aggregated transaction amounts for the category of another user) by including more transactions into the anomalous category.

The reassigned categories and the current transactions can be used by distribution generator 122 to update the distribution parameters for each category. In some examples, the update is performed when the category of one candidate transaction is reassigned. In some examples, alternatively, the update is performed when the categories of a batch of candidate transactions are reassigned. Accordingly, the updated distributions can be used by anomaly detector 124 to identify new anomalous categories, which can be in turn used by category rectifier 126 to reassign the categories of new candidate transactions, if any.

Alternatively, if there is no anomalous category identified, anomaly detector 124 can generate corrected categories 130 for the current transactions. Accordingly, corrected categories 130 can be generated when the iterative process terminates (e.g., when no category is identified as an anomaly by anomaly detector 124).

As such, it is possible that only a subset of the candidate transactions have reassigned categories before the anomalies become not significant (e.g., no anomalous category is identified).

In some examples, the candidate transactions are presented to the user to change the categories of some of the candidate transactions, and the iterative process is based on the updated categories by the user.

In some examples, the candidate transactions and their reassigned categories are used as training data and associated labels to retrain the first machine learning model, such that the first machine learning model can more accurately predict the categories for future transactions.

Example Process for Parameter Normalization

Figure 2:
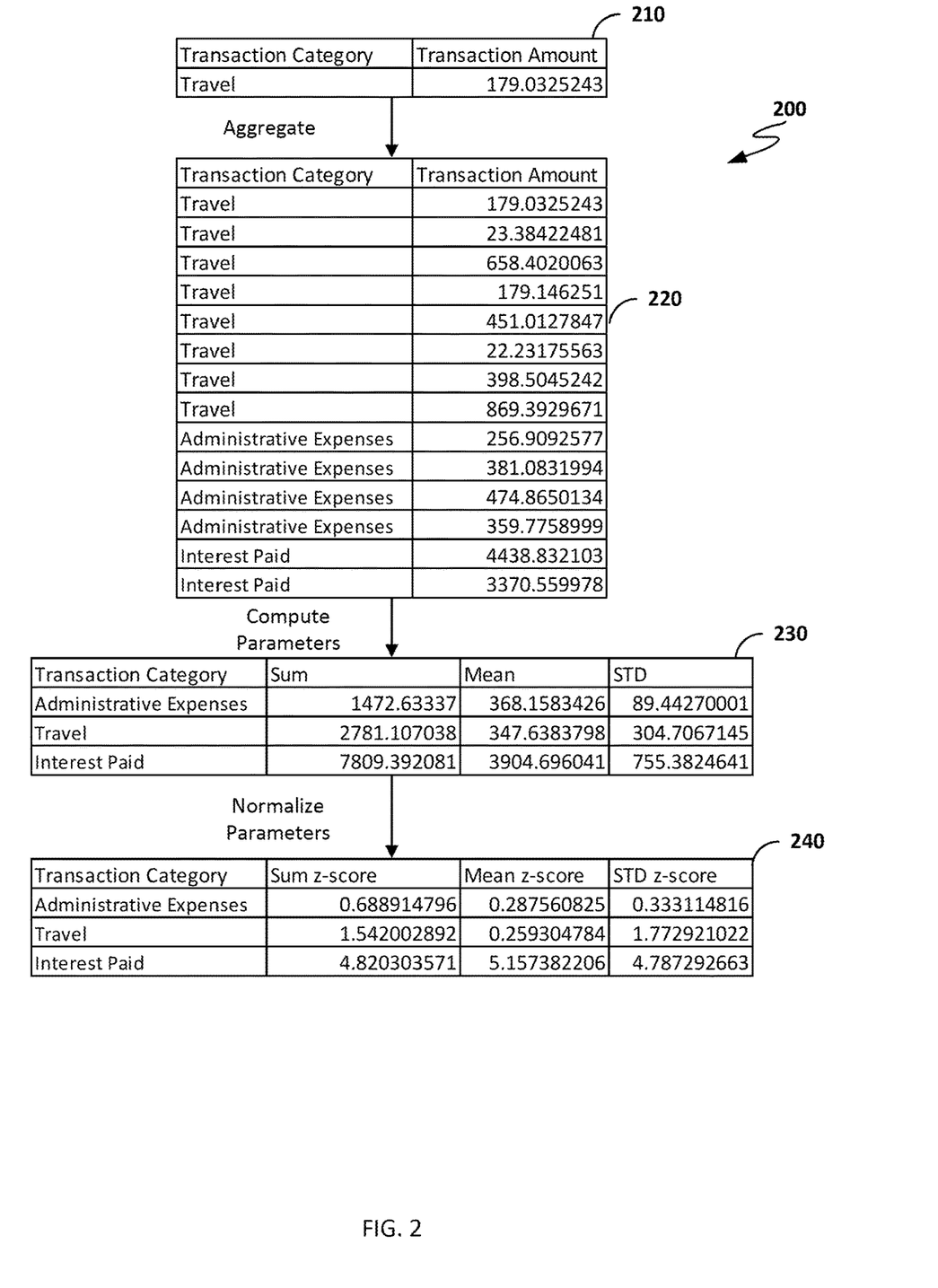
FIG. 2 depicts an example process for parameter normalization during detecting and correcting outliers in categories of transactions.

FIG. 2 depicts an example process 200 for parameter normalization for distribution parameters during detecting and correcting outliers in categories of transactions. Process 200 can be carried out by a categorization system, such as categorization system 100 as illustrated in FIG. 1. Although FIG. 2 depicts the categories for one user, process 200 can be performed for more users in series or in parallel. In addition, though FIG. 2 depicts several categories for a user, more or fewer categories can be present for the user.

Process 200 can start by receiving current transaction 210 with a predicted category. For example, the predicted category can be generated by a category predictor, such as category predictor 120 illustrated in FIG. 1. In this example, as illustrated, the predicted category of the current transaction is "travel" (e.g., by the "transaction category" column), and the current transaction indicates a transaction amount (e.g., by the "transaction amount" column).

Process 200 can then aggregate current transaction 210 with historical transactions sharing the same user (e.g., via a user identifier) with current transaction 210 to generate aggregated transactions 220 for the user. The aggregation can be performed by a distribution generator, such as distribution generator 122 illustrated in FIG. 1. In this example, as illustrated, the user has a total of 14 transactions, which falls into categories "travel", "administrative expenses", and "interest paid".

Accordingly, for each category, parameters 230 representing a distribution can be calculated by the distribution generator using the transactions in the category. In this example, as illustrated, parameters 230 include a sum of the transaction amount for each category (e.g., through the "sum" column), a mean of the of the transaction amount for each category (e.g., through the "mean" column), and a standard deviation of the transaction amount for each category (e.g., through the "STD" column).

Process 200 can further normalize parameters 230 to generate normalized parameters 240. In this example, as illustrated, each parameter of a category in normalized parameters 240 is a z-score of the parameter of the category across the categories. As illustrated, the normalized sum of "travel" is the z-score of the sum of "travel" in the distribution of the sums of "travel", "administrative expenses", and "interest paid".

In some examples, alternatively, the normalized parameters 240 are generated by normalizing each parameter of a category with respect to the sum of the parameters in the category. For example, the normalized sum of "travel" would be the sum of "travel" divided by the sums of "travel", "administrative expenses", and "interest paid", as discussed with respect to FIG. 1.

Normalized parameters 240 can be used to determine an anomalous category and its direction of anomaly (e.g., too high or too low). The determination can be performed by an anomaly detector, such as anomaly detector 124 illustrated in FIG. 1. Candidate transactions can be identified from the aggregated transactions. The categories of some of the candidate transactions can be reassigned to reduce the direction of the anomaly, as discussed with respect to in FIG.

1. Accordingly, process 200 can be performed iteratively until no anomalous category is present.

In this example, if "administrative expenses" is an anomalous category and its nearest non-anomalous neighbor category is "administrative expenses" of another user and the direction of anomaly of "administrative expenses" is too low (e.g., the z-score of "administrative expenses" of the user is smaller than the z-score of "administrative expenses" of the other user). Accordingly, some transactions in "travel" and "interest paid" of the user can be identified as candidate transactions. The categories of some candidate transactions can be reassigned to "administrative expenses", such that the "administrative expenses" category include more transactions. The categories of candidate transactions can be reassigned on a one-by-one basis or in batches, as discussed above with respect to FIG. 1.

Figure 3:
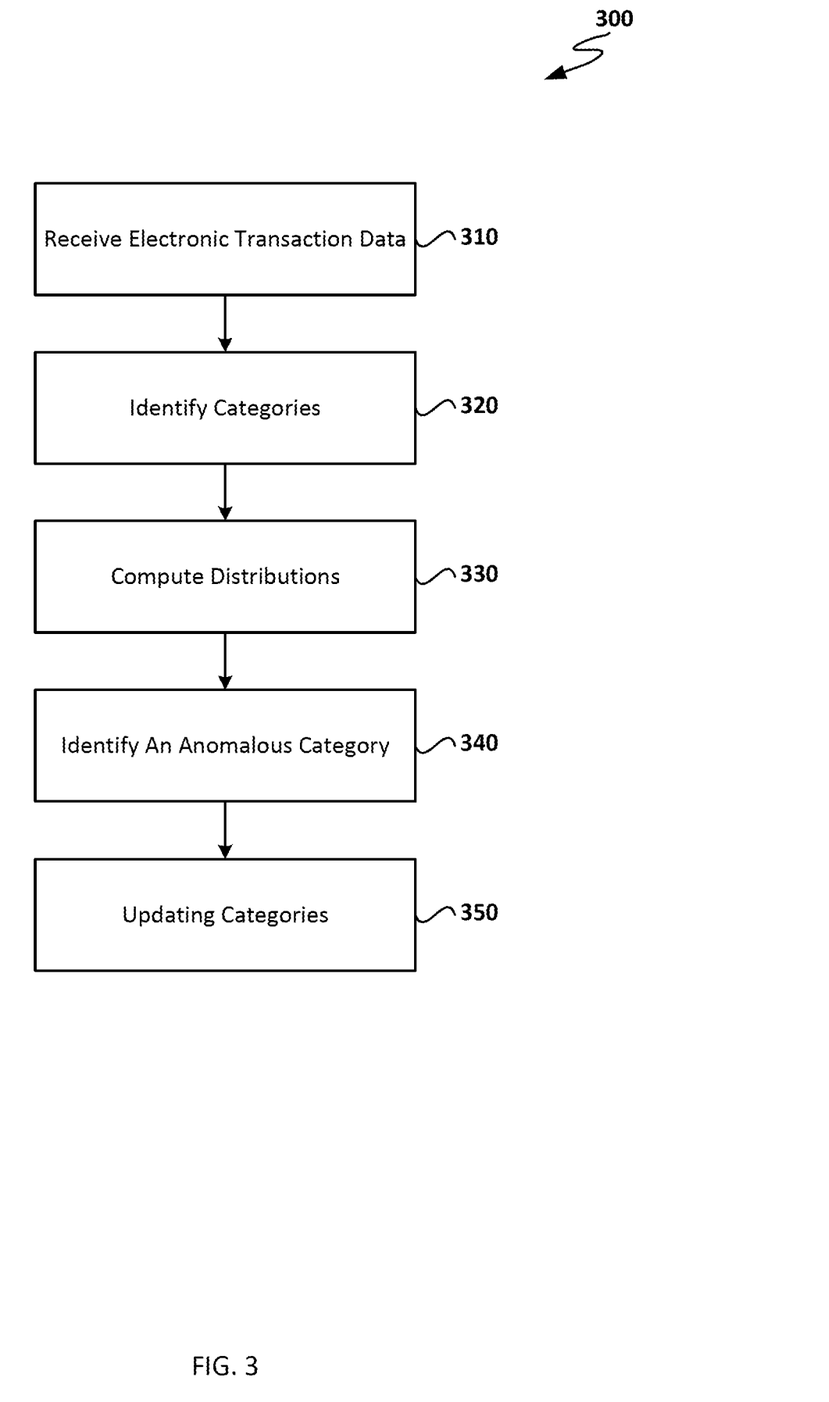
FIG. 3 is a flow diagram of example operations for detecting and correcting outliers in categories of transactions.

Example Operations for Detecting and Correcting Outliers in Categories of Transactions FIG. 3 is a flow diagram of example operations 300 for detecting and correcting outliers in categories of transactions. Operations 300 may be performed by a categorization system, such as categorization system 100 as illustrated in FIG. 1.

Operations 300 begin at 310, where electronic transaction data indicative of one or more transactions is received, wherein the one or more transactions are associated with a user of a software application. The electronic transaction data can be current transaction data 110 illustrated in FIG. 1.

At 320, a category is identified for each transaction of the one or more transactions, using a first machine learning model. For example, the category can be identified by category predictor 120 illustrated in FIG. 1 and the first machine learning model can be the first machine learning model discussed with respect to category predictor 120.

In some embodiments, the first machine learning model comprises a model trained to identify the category based on distribution vectors of classifications assigned to recipients associated with transactions with the recipients. For example, the distribution vectors can be the set of probabilities discussed with respect to FIG. 1. In such embodiments, the distribution vectors comprise distribution vectors for categories of transactions meeting a threshold number of transactions across users of a software application. For example, the threshold number can be the threshold of counts discussed with respect to FIG. 1.

In some embodiments, identifying, for each transaction of the one or more current transactions, the category using the first machine learning model comprises identifying a recipient associated with the transaction, identifying one or more other transactions associated with one or more other users and with the identified recipient, and identifying, from the one or more other transactions, one or more distinct categories associated with the one or more other transactions, computing, for each distinct category of the one or more distinct categories, a frequency of the distinct category, normalizing counts of the one or more distinct categories based on a sum of the counts, and determining a category from the one or more distinct categories using the first machine learning model based on the normalized counts. For example, the one or more other transactions can be historical transactions discussed with respect to FIG. 1.

At 330, a distribution is computed for each category of a plurality of categories of the user. For example, the distribution can be computed using distribution generator 122 illustrated in FIG. 1.

In some embodiments, computing the distribution for each respective category comprises computing, for the respective category, one or more statistics based on transactions in the category, normalizing each statistic of the one or more statistics based on a sum of the statistics, and constructing a distribution based on the normalized statistics. For example, the statistics can be the statistical descriptors discussed with respect to FIG. 1.

In some embodiments, a deviation of one or more statistical measures of the anomalous category meets a threshold score, such as the threshold score discussed with respect to FIG. 1.

At 340, a particular category of the user is identified as an anomalous category, based on the distribution for the particular category of the user and corresponding distributions for the particular category of other users. For example, the anomalous category can be identified using anomaly detector 124 illustrated in FIG. 1, and the second machine learning model can be the second machine learning model discussed with respect to anomaly detector 124.

In some embodiments, identifying, using a second machine learning model, a particular category of the user as an anomalous category, based on the distribution for the particular category of the user and the corresponding distributions for the particular category of the other users comprises identifying a direction of an anomaly of the particular category of the user relative to statistical measures for the particular category of the other users. For example, the direction of an anomaly can be the direction of an anomaly discussed with respect to FIG. 1.

At 350, a category assigned to one or more transactions is updated such that a delta between a value relating to the anomalous category of the user and corresponding values relating to the particular category of the other users is reduced. For example, the update can be performed by category rectifier 126 illustrated in FIG. 1.

In some embodiments, the direction of the anomaly indicates that an aggregate value of transactions in the particular category of the user is higher than those in the particular category of the other users, and updating a category assigned to one or more transactions comprises identifying one or more candidate transactions in the particular category of the user based on a probability that each respective candidate transaction in the particular category belongs in the category, and reassigning the categories of the one or more candidate transactions from the particular category to the other categories until the aggregate value of transactions in the category is no longer higher than those in the particular category of the other users. For example, the direction of the anomaly is too high whereas the candidate transactions are from the anomalous category, as discussed with respect to FIG. 1.

In some embodiments, alternatively, the direction of the anomaly indicates that an aggregate value of transactions in the particular category of the user is lower than those in the particular category of the other users, and updating a category assigned to one or more transactions comprises identifying one or more candidate transactions in the other categories of the user based on a probability that each respective candidate transaction in the other categories belongs in the other categories, and reassigning the categories of the one or more candidate transactions from the other categories to the particular category until the aggregate value of transactions in the particular category is no longer lower than those in the particular category of the other users. For example, the direction of the anomaly is too low whereas the candidate transactions are from other categories, as discussed with respect to FIGS. 1-2.

Example Application Server

Figure 4:
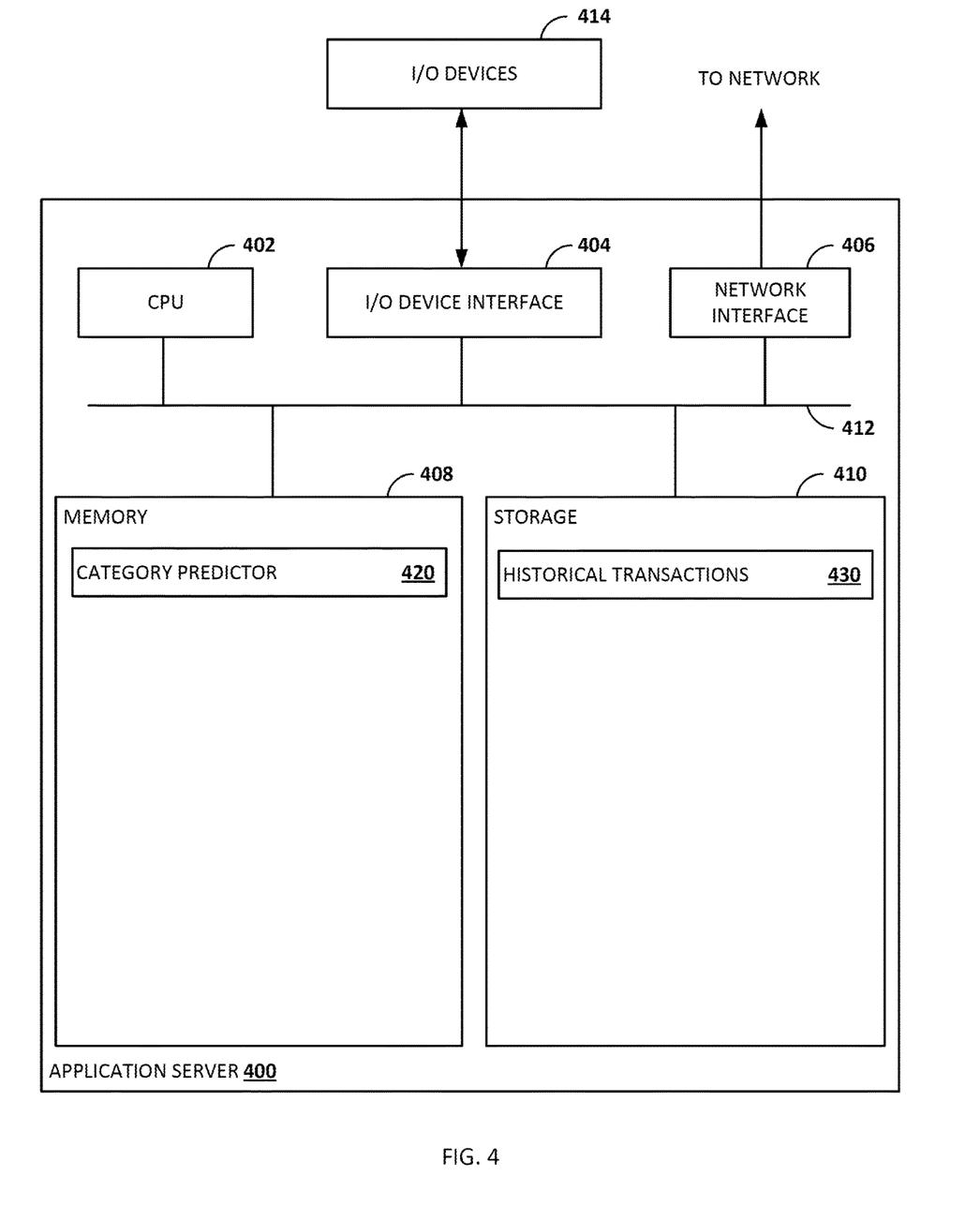
FIG. 4 depicts an example application server related to embodiments of the present disclosure.

FIG. 4 depicts an example application server 400, which can be used to deploy categorization system 100 of FIG. 1. As shown, application server 400 includes a central processing unit (CPU) 402, one or more input/output (I/O) device interfaces 404, which may allow for the connection of various I/O devices 414 (e.g., keyboards, displays, mouse devices, pen input, etc.) to application server 400, a network interface 406, a memory 408, a storage 410, and an interconnect 412.

CPU 402 may retrieve and execute programming instructions stored in memory 408. Similarly, CPU 402 may retrieve and store application data residing in memory 408. Interconnect 412 transmits programming instructions and application data, among CPU 402, I/O device interface 404, network interface 406, memory 408, and storage 410. CPU 402 is included to be representative of a single CPU, multiple CPUs, a single CPU having multiple processing cores, and the like. I/O device interface 404 may provide an interface for capturing data from one or more input devices integrated into or connected to application server 400, such as keyboards, mice, touchscreens, and so on. Memory 408 may represent a random access memory (RAM), while storage 410 may be a solid state drive, for example. Although shown as a single unit, storage 410 may be a combination of fixed and/or removable storage devices, such as fixed drives, removable memory cards, network attached storage (NAS), or cloud-based storage.

As shown, memory 408 includes categorization system 420. Categorization system 420 may be the same as or substantially similar to categorization system 100 of FIG. 1.

As shown, storage 410 includes historical transactions 430. Historical transactions 430 may be the same as or substantially similar to historical transactions discussed with respect to FIG. 1.

It is noted that the components depicted in application server 400 are included as examples, and other types of computing components may be used to implement techniques described herein. For example, while memory 408 and storage 410 are depicted separately, components depicted within memory 408 and storage 410 may be stored in the same storage device or different storage devices associated with one or more computing devices.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method, comprising:
   receiving electronic transaction data indicative of one or more current transactions, wherein the one or more current transactions are associated with a user of a software application;
   identifying, for each transaction of the one or more transactions, a category using a first machine learning model;
   computing, for the user, a distribution for each category of a plurality of categories, wherein each category of the plurality of categories has also been assigned to a plurality of other transactions by other users of the software application;
   identifying, using a second machine learning model, a particular category of the plurality of categories as an anomalous category for the user, based on the distribution computed for the user for the particular category and corresponding distributions for the other users for the particular category; and
   updating a category assigned to at least one of the one or more transactions such that a delta between a value for the user relating to the anomalous category and corresponding values for the other users relating to the particular category is reduced.

2. The method of claim 1, wherein the first machine learning model comprises a model trained to identify the category based on distribution vectors of classifications assigned to recipients associated with transactions with the recipients.

3. The method of claim 2, wherein the distribution vectors comprise distribution vectors for categories of transactions meeting a threshold number of transactions across users of a software application.

4. The method of claim 1, wherein identifying, for each transaction of the one or more current transactions, the category using the first machine learning model comprises:
   identifying a recipient associated with the transaction;
   identifying one or more other transactions associated with one or more other users and with the identified recipient; and
   identifying, from the one or more other transactions, one or more distinct categories associated with the one or more other transactions;
   computing, for each distinct category of the one or more distinct categories, a frequency of the distinct category;
   normalizing counts of the one or more distinct categories based on a sum of the counts; and
   determining a category from the one or more distinct categories using the first machine learning model based on the normalized counts.

5. The method of claim 1, wherein computing the distribution for each respective category comprises:
 computing, for the respective category, one or more statistics based on transactions in the category;
 normalizing each statistic of the one or more statistics based on a sum of the statistics; and
 constructing a distribution based on the normalized statistics.

6. The method of claim 1, wherein a deviation of one or more statistical measures of the anomalous category meets a threshold score.

7. The method of claim 1, wherein identifying, using a second machine learning model, a particular category of the plurality of categories as an anomalous category for the user, based on the distribution computed for the user for the particular category and the corresponding distributions for the other users for the particular category comprises identifying a direction of an anomaly for the user of the particular category relative to statistical measures for the other users for the particular category.

8. The method of claim 7, wherein:
 the direction of the anomaly for the user indicates that an aggregate value of transactions in the particular category is higher than those for the other users in the particular category; and
 updating a category assigned to one or more transactions comprises:
  identifying one or more candidate transactions for the user in the particular category based on a probability that each respective candidate transaction in the particular category belongs in the category; and
  reassigning the categories of the one or more candidate transactions from the particular category to the other categories until the aggregate value of transactions in the category is no longer higher than those for the other users in the particular category.

9. The method of claim 7, wherein:
 the direction of the anomaly for the user indicates that an aggregate value of transactions in the particular category is lower than those for the other users in the particular category; and
 updating a category assigned to one or more transactions comprises:
  identifying one or more candidate transactions for the user in the other categories based on a probability that each respective candidate transaction in the other categories belongs in the other categories; and
  reassigning the categories of the one or more candidate transactions from the other categories to the particular category until the aggregate value of transactions in the particular category is no longer lower than those for the other users in the particular category.

10. A system, comprising:
 a memory including computer-executable instructions; and
 a processor configured to execute the computer-executable instructions and cause the system to:
  receive electronic transaction data indicative of one or more current transactions, wherein the one or more current transactions are associated with a user of a software application;
  identify, for each transaction of the one or more transactions, a category using a first machine learning model;
  compute, for the user, a distribution for each category of a plurality of categories, wherein each category of the plurality of categories has also been assigned to a plurality of other transactions by other users of the software application;
  identify, using a second machine learning model, a particular category of the plurality of categories as an anomalous category for the user, based on the distribution computed for the user for the particular category and corresponding distributions for the other users for the particular category; and
  update a category assigned to at least one of the one or more transactions such that a delta between a value for the user relating to the anomalous category and corresponding values for the other users relating to the particular category is reduced.

11. The system of claim 10, wherein the first machine learning model comprises a model trained to identify the category based on distribution vectors of classifications assigned to recipients associated with transactions with the recipients.

12. The system of claim 11, wherein the distribution vectors comprise distribution vectors for categories of transactions meeting a threshold number of transactions across users of a software application.

13. The system of claim 10, wherein identifying, for each transaction of the one or more current transactions, the category using the first machine learning model comprises:
 identifying a recipient associated with the transaction;
 identifying one or more other transactions associated with one or more other users and with the identified recipient; and
 identifying, from the one or more other transactions, one or more distinct categories associated with the one or more other transactions;
 computing, for each distinct category of the one or more distinct categories, a frequency of the distinct category;
 normalizing counts of the one or more distinct categories based on a sum of the counts; and
 determining a category from the one or more distinct categories using the first machine learning model based on the normalized counts.

14. The system of claim 10, wherein computing the distribution for each respective category comprises:
 computing, for the respective category, one or more statistics based on transactions in the category;
 normalizing each statistic of the one or more statistics based on a sum of the statistics; and
 constructing a distribution based on the normalized statistics.

15. The system of claim 10, wherein a deviation of one or more statistical measures of the anomalous category meets a threshold score.

16. The system of claim 10, wherein identifying, using a second machine learning model, a particular category of the plurality of categories as an anomalous category for the user, based on the distribution computed for the user for the particular category and the corresponding distributions for the other users for the particular category comprises identifying a direction of an anomaly for the user of the particular category relative to statistical measures for the other users for the particular category.

17. The system of claim 16, wherein:
 the direction of the anomaly for the user indicates that an aggregate value of transactions in the particular category is higher than those for the other users in the particular category; and updating a category assigned to one or more transactions comprises:

identifying one or more candidate transactions for the user in the particular category based on a probability that each respective candidate transaction in the particular category belongs in the category; and reassigning the categories of the one or more candidate transactions from the particular category to the other categories until the aggregate value of transactions in the category is no longer higher than those for the other users in the particular category.

18. The system of claim 16, wherein:

the direction of the anomaly for the user indicates that an aggregate value of transactions in the particular category is lower than those for the other users in the particular category; and updating a category assigned to one or more transactions comprises:

identifying one or more candidate transactions for the user in the other categories based on a probability that each respective candidate transaction in the other categories belongs in the other categories; and reassigning the categories of the one or more candidate transactions from the other categories to the particular category until the aggregate value of transactions in the particular category is no longer lower than those for the other users in the particular category.

19. A non-transitory computer readable medium comprising instructions to be executed in a computer system, wherein the instructions when executed in the computer system cause the computer system to:

receive electronic transaction data indicative of one or more current transactions, wherein the one or more current transactions are associated with a user of a software application;

identify, for each transaction of the one or more transactions, a category using a first machine learning model;

compute, for the user, a distribution for each category of a plurality of categories, wherein each category of the plurality of categories has also been assigned to a plurality of other transactions by other users of the software application;

identify, using a second machine learning model, a particular category of the plurality of categories as an anomalous category for the user, based on the distribution computed for the user for the particular category and corresponding distributions for the other users for the particular category; and update a category assigned to at least one of the one or more transactions such that a delta between a value for the user relating to the anomalous category and corresponding values for the other users relating to the particular category is reduced.

20. The non-transitory computer readable medium of claim 19, wherein the first machine learning model comprises a model trained to identify the category based on distribution vectors of classifications assigned to recipients associated with transactions with the recipients.

* * * * *